Patented Oct. 10, 1950

2,525,480

UNITED STATES PATENT OFFICE 2,525,480

ANION EXCHANGE RESINS

James R. Dudley, Greenwich, Conn., assignor to American Cyanamid Company, New York, N. Y., a corporation of Maine No Drawing. Application January 19, 1946, Serial No. 642,416

9 Claims. (Cl. 210—24)

This invention relates to resins suitable for the removal of anions from liquid media, to processes of preparing such resins, and to processes of purifying liquid media by means of such resins.

It is an object of the present invention to provide a resinous material which is insoluble in water and which is suitable for removing anions from water and other liquid media.

Another object of the present invention is to provide a process of producing resinous materials suitable for the removal of anions from liquid media.

Still another object of the present invention is to prepare an anion active resin from an aldehyde and a furyl substituted aliphatic amine.

A further object of the present invention is to provide an improved process for removing anions from water and other liquid media.

These and other objects are attained by condensing an aldehyde with a furyl substituted aliphatic amine, permitting the condensation product to gel, curing the gel by heating, granulating the cured gel, and contacting the granulated gel with a liquid containing anions.

The present invention will be described in greater detail in conjunction with the following specific examples in which the proportions are given in parts by weight unless otherwise indicated. The examples are merely illustrative and are not intended to limit the scope of the invention.

Example 1

94.5 parts of tetraethylenepentamine (0.5 mol)
202 parts of 95% furfural (2.0 mols)
243 parts of 37% hydrochloric acid (2.5 mols)
442 parts of water The amine is condensed with 101 parts of the furfural in aqueous solution at a temperature of not more than 30° C. The resulting difurfurylidenetetraethylenepentamine is acidified with an aqueous solution of the hydrochloric acid and furfural is added to the acidified solution.

The reaction mixture is stirred for about a half hour. The gel which forms is allowed to stand about 18 hours and is then granulated and cured by heating for 4 hours at 50° C. followed by 4 hours at 100° C.

The dried resin is ground and sieved, and the 20–40 mesh material is found to have a capacity for removing anions from a solution of 12.2 kilograins of calcium carbonate per cubic foot of resin and a density of 17.5 lbs./cu. ft.

Example 2

Example 1 is repeated except that 292 parts of hydrochloric acid (3.0 mols) are used. The resulting resin is almost identical with that formed in Example 1, its capacity being 12.5 kilograins of calcium carbonate per cubic foot of resin and its density being 17.2 lbs./cu. ft.

Example 3

51.5 parts of diethylenetriamine (0.5 mol)
202 parts of 95% furfural (2.0 mols)
146 parts of 37% hydrochloric acid (1.5 mols)
160 parts of water 101 parts of the furfural are added with stirring to the polyamine in portions. The temperature rises to 100° C. at which point the water is added and the solution cooled to 5° C. The acid is then added slowly with cooling so that the temperature does not exceed 20° C., and the remainder of the furfural is finally added to the solution. Stirring is continued for 1½ hours and the reaction mixture then allowed to stand. The gel which forms is granulated and cured for 4 hours at 50° C., followed by 4 hours at 100° C.

The resin has a capacity of 9.3 kilograins of calcium carbonate per cubic foot of resin and a density of 21.3 lbs./cu. ft.

Example 4

96 parts of difurfuryl ethylenediamine (0.5 mol)
101 parts of 95% furfural (1.0 mol)
122 parts of 37–38% hydrochloric acid (1.25 mols)
261 parts of water The acid is added to the water and this solution in turn to the difurfuryl ethylenediamine. The furfural is then added, the solution stirred for one-half hour, and allowed to stand. The gel which forms is granulated and cured for 4 hours at 50° C. and 4 hours at 100° C.

The resin obtained has a capacity of 4.5 kilograins of calcium carbonate per cubic foot of resin and a density of 31.9 lbs./cu. ft.

Example 5

117.5 parts of difurfuryl diethylenetriamine (0.5 mol)
63 parts of 95% furfural (.625 mol)
94 parts of 37% hydrochloric acid (.97 mol)
225 parts of water The procedure of Example 4 is followed, and the resin obtained has a capacity of 5.6 kilograins of calcium carbonate per cubic foot of resin and a density of 25.5 lbs./cu. ft.

Example 6

139 parts of difurfuryl triethylenetetramine (0.5 mol)
50.5 parts of 95% furfural (0.5 mol)
146 parts of concentrated hydrochloric acid (1.5 mols)
275 parts of water The procedure of Example 4 is followed, and the resulting resin is found upon evaluation to have a capacity of 13.7 kilograins of calcium carbonate per cubic foot of resin and a density of 21.9 lbs./cu. ft.

Example 7

160 parts of difurfuryl tetraethylenepentamine (0.5 mol)
75.8 parts of 95% furfural (0.75 mol)
170 parts concentrated hydrochloric acid (1.75 mols)
332 parts of water The procedure of Example 4 is followed, and the resin obtained is found upon evaluation to have a capacity of 16.1 kilograins of calcium carbonate per cubic foot of resin and a density of 17.1 lbs./cu. ft.

Example 8

97 parts of furfuryl amine (1 mol)
202 parts of 95% furfural (2 mols)
243 parts of concentrated hydrochloric acid (2.5 mols)
444 parts of water The furfuryl amine is acidified with a solution of the hydrochloric acid in the water and the furfural is added to the acidified aqueous solution. The reaction mixture is stirred for about one-half hour and the gel which forms is allowed to stand about 12 hours. It is then granulated to small particles and cured for 4 hours in water at 90° C. The resulting resin has a capacity of 4.5 kilograins of calcium carbonate per cubic foot of resin and a density of 14.3 lbs./cu. ft.

Example 9

55.5 parts of methyl furfuryl amine (0.5 mol)
75.8 parts of 95% furfural (0.75 mol)
97 parts of concentrated hydrochloric acid (1.0 mol)
187 parts of water The procedure of Example 8 is followed except that the gel obtained is cured for 4 hours at 50° C. and 4 hours at 100° C. It is then evaluated at 70° C. and found to have a capacity of 8.6 kilograins of calcium carbonate per cubic foot of resin and a density of 28.3 lbs./cu. ft.

Example 10

61.2 parts of butyl furfuryl amine (0.4 mol)
60.6 parts of 95% furfural (0.6 mol)
48.5 parts of concentrated hydrochloric acid (0.5 mol)
140 parts of water The procedure of Example 9 is followed except that the cured and ground resin is evaluated at normal temperatures i. e. about 20° C. It has a capacity of 5.1 kilograins of calcium carbonate per cubic foot of resin and a density of 23.0 lbs./cu. ft.

Example 11

61.2 parts of butyl furfuryl amine (0.4 mol)
50.5 parts of 95% furfural (0.5 mol)
77.6 parts of concentrated hydrochloric acid (0.8 mol)
155 parts of water The procedure of Example 10 is carried out and the resulting resin found to have a capacity of 5.5 kilograins of calcium carbonate per cubic foot of resin and a density of 25.8 lbs./cu. ft.

Example 12

61.2 parts of butyl furfuryl amine (0.4 mol)
80.8 parts of 95% furfural (0.8 mol)
77.6 parts of concentrated hydrochloric acid (0.8 mol)
180 parts of water The procedure of Example 10 is followed and the resulting resin found to have a capacity of 5.6 kilograins of calcium carbonate per cubic foot of resin and a density of 25.5 lbs./cu. ft.

Example 13

94.5 parts of tetraethylenepentamine (0.5 mol)
101 parts of furfural (1.0 mol)
297 parts of concentrated hydrochloric acid (3.0 mols)
30 parts of formaldehyde (1.0 mol)
47 parts of water The furfural is added slowly to a solution of the tetraethylenepentamine and water, the temperature being maintained below 30° C. throughout the addition. The resulting syrup is cooled to below 10° C. and the hydrochloric acid is added at such a rate that the temperature does not rise above 20° C. After this addition is complete, the formaldehyde is added rapidly, the mixture is agitated for about a half hour and then permitted to stand. After 96 hours a soft, black, lustrous, resilient gel forms which is granulated and cured for 4 hours at 50° C. and 4 hours at 100° C.

The dried resin is ground and sieved and found on evaluation to have a capacity for removing anions from solution of 19.7 kilograins of $CaCO_3$ per cubic foot of resin.

Example 14

The procedure of Example 13 is followed except that a mixture of 15 parts (0.5 mol) of formaldehyde and 50.5 parts (0.5 mol) of furfural are substituted for the formaldehyde added after acidification with the hydrochloric acid.

The resin obtained has a capacity for removing anions from solution of 13.3 kilograins of $CaCO_3$ per cubic foot of resin.

The difurfuryl polyamines used as starting materials in Examples 4, 5, 6 and 7 may be prepared as follows: Furfural and the desired polyamine, in the molar proportion of 2:1, are allowed to react with one another for about an hour to produce the corresponding difurfurylidene derivative. The difurfurylidene polyamine derivative is then directly hydrogenated in a methanol solution using a Raney nickel catalyst. The difurfurylidine derivative need not be reduced but if desired, may be resinified directly with furfural as in Examples 1 and 2. Moreover, the corresponding monofurfuryl- and monofurfurylidene-amines may also be resinified according to the present invention.

Other polyamines may be substituted for part or all of those used in the examples. Furthermore, mixtures of two, three, five or any other number of polyamines may be employed. Examples of suitable polyamines include 1,3-diamino propane, 1,4-diamino-n-butane, 1,3-diamino-n-butane, 1,5-diamino-n-pentane, 1,6-diamino-n-hexane, 1,10-diamino-n-decane, 1,6-diamino-3-methyl-n-hexane, ethylenediamine, diethylenetriamine, triethylenetetramine, tetraethylenepentamine, pentaethylenehexamine, and all of the higher homologues thereof containing additional —$CH_2CH_2NH$— groups in the chain between the primary amino groups, etc. Complex mixtures of polyalkylenepolyamines of high molecular weight obtained by the addition of large numbers of molecules of ammonia or amines to alkaline dihalides or chlorhydrins may be used.

The molar ratio of furfural to polyamine may vary considerably without markedly affecting the properties of the condensation products. It is desirable that the molar ratio of furfural to difuryl polyamine be from 1:1 to 2:1 or that of furfural to polyamine from 3:1 to 4:1 and I have found that a molar ratio of furfural to difuryl polyamine of about 1.5 to 1 produces excellent results. However, proportions up to 10:1, furfural to polyamine, may be used without departing from the scope of the invention. The use of proportionately less furfural than that of my preferred embodiment in some cases will, give products having less satisfactory characteristics, while the use of comparatively more furfural appears to offer no particular advantage.

The amount of hydrochloric acid condensing agent which may be used in the preparation of the polyamine resins of the present invention is a varying element. From about 1 to 6 mols of hydrochloric acid per mol of polyamine may be used. I have found, however, that the tendency which the polyamine resinous compositions of the present invention have to produce color in a supernatant liquid when left standing therein is decreased by increasing the amount of acid used in the preparation of the resin. Accordingly, I prefer to use about 5 to 6 mols of acid per mol of polyamine. A negligible decrease in capacity accompanies the use of this increased amount of acid, and moreover, the gelation time is shortened, thus making the preparation more workable.

It will be apparent that satisfactory anion exchange resins may be prepared from furfural and alkylene polyamines by two methods. The first involves an alkaline condensation of furfural with an aliphatic polyamine, acidification with a mineral acid and resinification with furfural. The second process involves the condensation of furfural with difurfuryl polyamines in the presence of a mineral acid condensing agent. As has been pointed out above, the difurfuryl polyamines may be prepared by reduction of difurfurylidine polyamines which, in turn, may be prepared by the alkaline condensation of furfural with aliphatic polyamines.

Resins prepared by the two above processes have comparable capacities and other physical and chemical characteristics. It is therefore apparent that the first process, which does not involve a hydrogenation step, is probably the more economical, although it should be understood that resins obtained by either process are satisfactory anion exchangers and fall within the scope of the present invention.

I have found that, in general, resins prepared from the higher polyamines have better properties than those prepared from the lower homologues in the polyamine series and in fact, the capacities of the resins seem to vary directly with the number of amino groups present in the polyamine. Although it is therefore desirable from a capacity standpoint to use the higher polyamines, it may be more economical to use mixtures of the polyamines which are available at a lower cost.

The mechanism of the reaction between the polyamines and the furfural is not known, and I do not wish to be limited to any particular theory thereof. The condensation of furfural with polyamines to form intermediates which in turn, may be converted into water-insoluble resins suitable for anion exchange will take place readily only in alkaline solution although the corresponding furyl substituted polyamines and furfural react smoothly and rapidly in the presence of a mineral acid to form a gel which, when cured and granulated, is suited for ion exchange processes. It would seem therefore that a prerequisite for the formation of a water-insoluble ion active furfural type resin from an aliphatic polyamine is the presence in the polyamine molecule of a furane ring.

Furfuryl amine, used as the starting material in Example 8, may be prepared by the reduction of:

(1) The phenylhydrazone of furfural with sodium amalgam and acetic acid in alcohol, (2) Furfuraldoxime with sodium amalgam and acetic acid in alcohol, or (3) Alcoholic solutions of furfural and ammonia by direct hydrogenation over a base metal catalyst such as nickel.

The substituted furfuryl amines of Examples 9–12, inclusive, may be easily prepared by reduction with sodium and alcohol of N-alkyl furfuraldamines which are in turn prepared by reaction of furfural with the corresponding alkyl amine. It should be understood that the particular method of preparation of the furfuryl amine forms no part of the present invention and furfuryl amines from any source are operative in my process.

Other furfuryl amines may be substituted for part or all of those used in the examples. Furthermore, mixtures of any number of furfuryl amines may be employed. Examples of suitable furfuryl amines include furfuryl amine, alkyl furfuryl amines such as methyl furfuryl amine, ethyl furfuryl amine, isopropyl furfuryl amine, butyl furfurylamine, hexyl furfurylamine, decyl furfuryl amine, dodecyl furfuryl amine, octadecyl furfuryl amine, etc., as well as difurfuryl amine, alkyl difurfuryl amines, and dialkyl furfuryl amines which may also be used. Moreover, the corresponding furyl and difuryl amines may be condensed with an aldehyde to produce insoluble anion active resinous materials.

I prefer to use from 1 to 2 molar proportions of furfural to one of furfuryl amine but other proportions up to about 10:1 may also be used.

The acid to furfuryl amine molar ratio is preferably about 1:1 or 2:1 although higher ratios, i. e. up to about 6:1, may be used if desired.

Part or all of the furfural used in the resinification of the furyl substituted amines may be replaced by formaldehyde, formaldehyde-yielding substances, acetaldehyde, acrolein, benzaldehyde, or other aldehydes. Mixtures of one or more different aldehydes may also be used. Furfuryl alcohol may also be used. Furfuryl alcohol may also be used, as a resinifying agent in place of furfural if desired.

The final heat treatment or curing of the resin is preferably carried out at a temperature of 95 to 105° C., although other conditions may be used including temperatures ranging from 50° C. up to about 125° C. or higher.

It is an advantage of the resins of the present invention that they are extremely stable in hot acid solutions. My new resinous compositions exhibit not only high resistance to such acid solutions but also high capacities for anion exchange in such solutions.

The anion active resins of the present invention may be activated or regenerated by means of dilute alkaline solutions, such as for example, 0.1–10% aqueous solutions of sodium hydroxide, sodium carbonate, etc.

It is preferable to grind and screen the resins to a particle size of from about 8–60 mesh. Use of larger particles causes channeling, and smaller particles of resin have been found to pack, thus reducing the anion exchange efficiency of the material.

The resinous materials produced in accordance with this invention are suitable for the removal of all kinds of acids and anions in general from liquid media. They may be used to extract the strong mineral acids (preferably in relatively low concentrations) and organic acids such as acetic acid, oxalic acid, etc., from water and organic liquids. The anions of salts such as chloride ion from ammonium chloride or sulfate ion from ammonium sulfate may be removed by means of the resinous products described herein.

The anion active resins are useful for many purposes examples of which are the removal of acid from water, the removal of acid from alcoholic solutions, the purification of sugar juices, the purification of pectin, the removal of acid from aqueous formaldehyde solutions, etc. While the resins are especially suitable for the removal of anions from aqueous media, they may be used to extract acids or anions from liquid media other than water. The resins may be used as absorbents for plant nutrients and as such may be used as a media for growing plants or as a means for applying nutrients to the soil.

To be sufficiently insoluble for practical use in the water purification art, resins should have a sufficiently low solubility that they will not be dissolved very rapidly by the solution to be treated. Thus, water should not dissolve more than 1 part of resin in 1000 parts of water when passed through a bed of resin (after the first cycle comprising an activation, exhaustion and reactivation of the resin).

I claim:

1. A resinous material as in claim 7 in which the furyl substituted aliphatic amine is a furyl substituted aliphatic polyamine.

2. A resinous material as in claim 7 in which the furyl substituted aliphatic amine is a furfuryl amine.

3. A resinous material as in claim 7 in which the furyl substituted aliphatic amine is a furfuryl polyalkylene polyamine.

4. A process of removing anions from liquid media which comprises contacting a liquid containing anions with the water-insoluble granular resinous material of claim 7 and separating the resinous material from the liquid.

5. A process for the removal of anions from aqueous solutions which comprises bringing an aqueous solution containing anions into contact with a water-insoluble granular resinous material of claim 7 and separating the resinous material from the aqueous solution.

6. A process for the removal of anions from aqueous solutions which comprises passing an aqueous solution containing anions through a bed of a water-insoluble granular resinous material of claim 7.

7. A water-insoluble granular resinous material prepared by condensing, as sole reactants, a furyl substituted aliphatic amine and furfural in the presence of acid, permitting the resulting condensation product to gel, curing the gel by heating, and granulating the cured gel.

8. A water-insoluble granular resinous material prepared by condensing, as sole reactants, difurfuryl tetraethylenepentamine and furfural in the presence of acid, permitting the resulting condensation product to gel, curing the gel by heating, and granulating the cured gel.

9. A process which comprises the steps of condensing, as sole reactants, a furyl substituted aliphatic amine and furfural in the presence of acid, permitting the resulting condensation product to gel, curing the gel by heating, and granulating the cured gel.

JAMES R. DUDLEY.

REFERENCES CITED

The following references are of record in the file of this patent:

UNITED STATES PATENTS

| Number | Name | Date |
| --- | --- | --- |
| 2,106,486 | Kirkpatrick | Jan. 25, 1938 |
| 2,151,883 | Adams et al. | Mar. 28, 1939 |
| 2,442,989 | Sussman | June 8, 1948 |